US007096637B2

(12) United States Patent
McMillan

(10) Patent No.: US 7,096,637 B2
(45) Date of Patent: Aug. 29, 2006

(54) DISPLAY STRUCTURE AND SYSTEM

(76) Inventor: John Charles McMillan, 25 Otter Trail, Westport, CT (US) 06880

( * ) Notice: Subject to any disclaimer, the term of this patent is extended or adjusted under 35 U.S.C. 154(b) by 341 days.

(21) Appl. No.: 10/226,882

(22) Filed: Aug. 23, 2002

(65) Prior Publication Data

US 2003/0038829 A1 Feb. 27, 2003

Related U.S. Application Data

(60) Provisional application No. 60/314,399, filed on Aug. 23, 2001.

(51) Int. Cl.
*F16B 7/04* (2006.01)
(52) U.S. Cl. .................. 52/653.1; 52/282.2; 52/735.1; 52/655.1; 403/248; 403/255
(58) Field of Classification Search ............. 52/282.2, 52/126.1, 282.1, 653.1, 735.1, 655.1, 656.9; 403/248, 252–253, 255, 363
See application file for complete search history.

(56) References Cited

U.S. PATENT DOCUMENTS

| 3,701,553 | A | | 10/1972 | Vogt-Patentvertwertungen |
| 3,945,742 | A | | 3/1976 | Condevaux |
| 4,017,199 | A | | 4/1977 | Strassle |
| 4,021,129 | A | * | 5/1977 | Sykes ......................... 403/252 |
| 4,142,343 | A | | 3/1979 | Trafton |
| 4,345,849 | A | | 8/1982 | Stenemann |
| 4,360,286 | A | * | 11/1982 | Beer ........................... 403/201 |
| 4,455,103 | A | | 6/1984 | Hackenberg |
| 4,490,064 | A | | 12/1984 | Ducharme |
| 4,558,544 | A | * | 12/1985 | Albrecht et al. ............ 52/126.6 |
| 4,583,359 | A | | 4/1986 | Staeger |
| 4,799,819 | A | * | 1/1989 | Swoboda ..................... 403/252 |
| 4,884,915 | A | | 12/1989 | Camitz |
| 4,951,440 | A | | 8/1990 | Staeger |
| 5,054,950 | A | | 10/1991 | Zillgen et al. |
| 5,101,607 | A | | 4/1992 | Staeger |
| D374,291 | S | | 10/1996 | Harbeke et al. |
| 5,657,604 | A | * | 8/1997 | Malott ........................ 52/655.1 |
| D383,220 | S | | 9/1997 | Harbeke et al. |
| D408,560 | S | | 4/1999 | Bruder |
| 6,223,917 | B1 | | 5/2001 | Bruder |
| 6,351,916 | B1 | | 3/2002 | Millitzer |
| 6,397,551 | B1 | | 6/2002 | Lewcock et al. |
| 6,402,420 | B1 | * | 6/2002 | Yang .......................... 403/381 |
| 6,505,453 | B1 | * | 1/2003 | Rixen et al. ............... 52/655.1 |

* cited by examiner

*Primary Examiner*—Basil Katcheves
(74) *Attorney, Agent, or Firm*—St. Onge Steward Johnston & Reens LLC

(57) ABSTRACT

A display system and structure is disclosed generally comprising a vertical post assembly and a horizontal beam assembly coupled thereto, wherein the beam assembly includes a beam, a housing, and a plate assembly extractable from the housing, which plate assembly has at least two plates, which, when separated, secure the beam assembly to the post assembly. In some embodiments, the plates have ridges that fit into a channel in the post assembly. In some embodiments, the post assembly includes a spline with a slot, and the plates have tongues which fit into the slot.

20 Claims, 16 Drawing Sheets

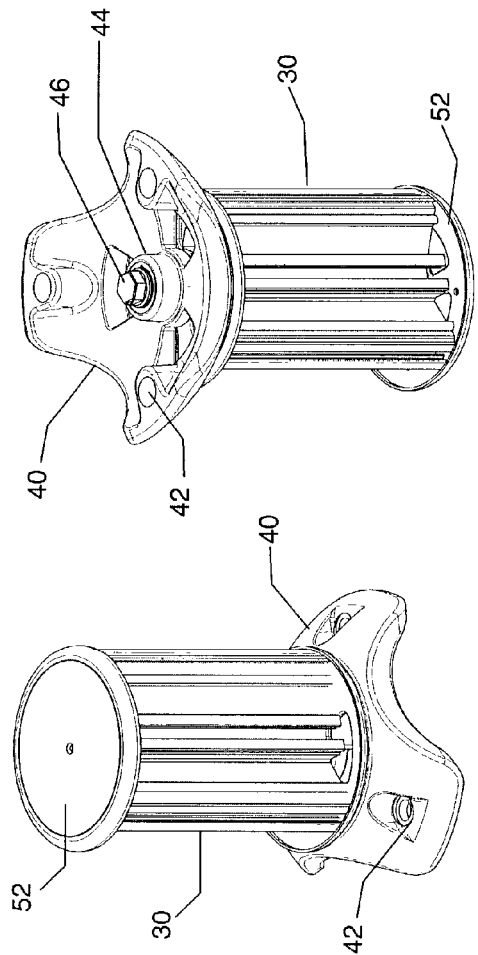
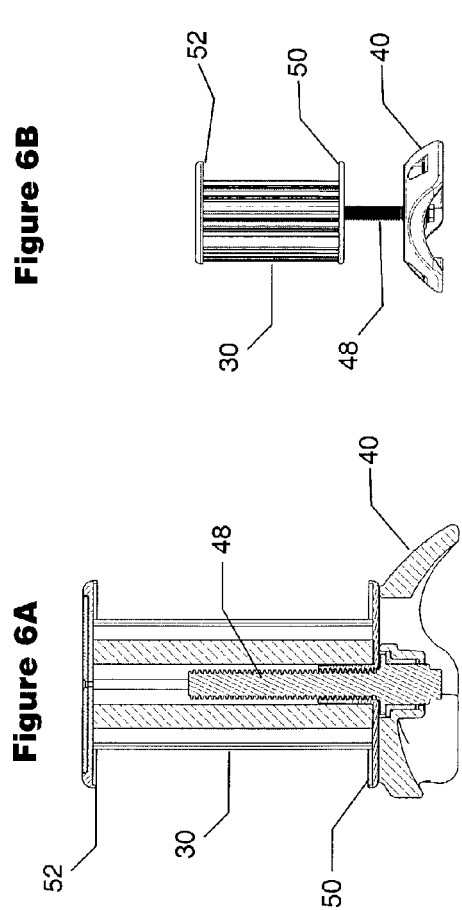

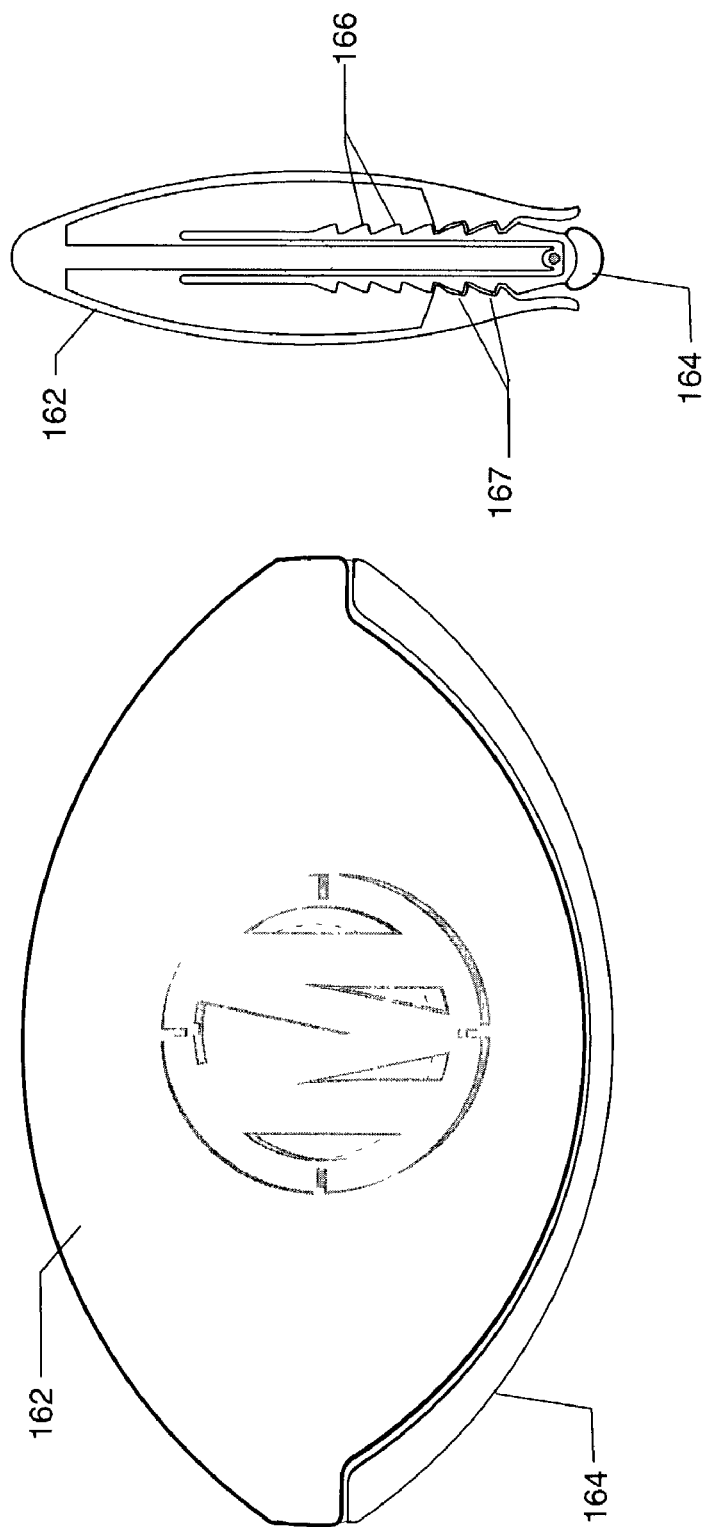

DISPLAY STRUCTURE AND SYSTEM

RELATED APPLICATIONS

This patent application claims the benefit of, under Title 35, United States Code, Section 119(e), U.S. Provisional Patent Application No. 60/314,399, filed Aug. 23, 2001.

FIELD OF THE INVENTION

The present invention relates to an apparatus and method for constructing display systems. More specifically, the invention relates to a mechanism for attaching and detaching individual frame members of the display systems.

BACKGROUND OF THE INVENTION

Systems similar to the present invention, known as display systems, construction systems, exhibition systems, or shop systems, provide an efficient manner of constructing temporary exhibits, showcases, booths, graphical displays, demonstration spaces, decks, and rooms that are quickly and easily assembled and disassembled. Such systems are commonly used for trade shows, symposiums, conventions, corporate centers, and museum exhibits.

It is known to use an arrangement of individual frame members as vertical posts and horizontal beams that connect together in order to create a skeletal framework. Such frameworks are often assembled for their own aesthetic qualities, which are often enhanced with various colors, coverings, lighting, and accessories. Additionally, such frameworks are often assembled to provide the support structure for temporary walls, decks, ceilings, and graphic surfaces and screens.

These systems often utilize beams having attachment elements protruding from their ends. These attachment elements typically correspond to a mating channel or hole in the vertical post. Thus, when one desires to connect a beam to a vertical post, one typically either laterally inserts the attachment member into the hole or inserts the attachment member into the channel at the top of the post and slides the beam down.

However, one disadvantage of these systems is that, because the beam has the added length of the attachment member, a horizontal beam that has not yet been connected to a pair of vertical posts already connected by a different horizontal beam is longer than the space between the two vertical posts. Accordingly, if a framework is already assembled, one desiring to add an additional beam must first disassemble the framework before the beam can be added. This disadvantage is exacerbated by the fact that the business of assembling such display systems is labor intensive, and the price of such labor is often high. Therefore, time wasted disassembling and reassembling proves to be very costly.

Another disadvantage of these systems is that the attachment members tend to be small, have little or no support once connected to the vertical post, and have minimal surface contact with the post, and thus, these frameworks are not capable of bearing great weight.

SUMMARY OF THE INVENTION

Accordingly, it is an object of the invention to provide a system for attaching and detaching beams to a vertical post assembly that permits one to add and remove individual beams to an existing display structure without having to disassemble portions of the structure.

It is a further object of the invention to provide a system for attaching and detaching individual beams that increases the surface area against which the attachment mechanism abuts, thereby increasing the amount of weight the display assembly can bear.

It is yet another object of the invention to provide a system for attaching and detaching individual beams that provides a bottom support for the attachment mechanism, thereby increasing the amount of weight the display assembly can bear.

It is still a further object of the invention to provide a system where the height of the beams may be adjusted without having to remove or add beams.

To overcome the deficiencies of the prior art and to achieve at least some of the objects and advantages listed, the invention comprises a display structure, comprising at least one vertical post assembly having a cavity therein, said cavity having two opposing walls, and at least one beam assembly coupled to the at least one vertical post assembly, the beam assembly including a beam, a connector housing, and a plate assembly disposed in, and extractable from, the connector housing, such that the plate assembly forms an extension of the housing when extracted therefrom, which extension is insertable into the cavity. The plate assembly comprises a plurality of connector plates, and at least one of the plates is displaceable away from at least one other of the plates when the plate assembly is extracted from the housing and inserted into the cavity such that the plate assembly is secured to the vertical post assembly.

The invention also relates to a method of assembling display systems, comprising the steps of providing a vertical post assembly including a cavity with a channel therein, providing a beam assembly including a connector housing and a plate assembly having two plates with ridges on the outer faces thereof disposed in the housing, moving the plate assembly from within the housing into the cavity, and exerting a force to separate the plates when the ridges are coplanar with the channel so that the ridges enter the channel, thereby retaining the plate assembly in the cavity.

The invention and its particular features will become more apparent from the following detailed description when considered with reference to the accompanying drawings.

BRIEF DESCRIPTION OF THE DRAWINGS

FIG. 6A is a top perspective view of the vertical post assembly of FIG. 5.

FIG. 6B is a bottom perspective view of the vertical post assembly of FIG. 5.

FIG. 6C is a side plan view of the vertical post assembly of FIG. 5 when the base is in a lowered position.

FIG. 6D is a side plan view of the vertical post assembly of FIG. 5 when the base is in a raised position.

FIG. 16 is another isometric side view of the in-line tensioning device of FIG. 14.

FIG. 17 is an end view of the in-line tensioning device of FIG. 14.

DETAILED DESCRIPTION OF THE DRAWINGS

Figure 1:
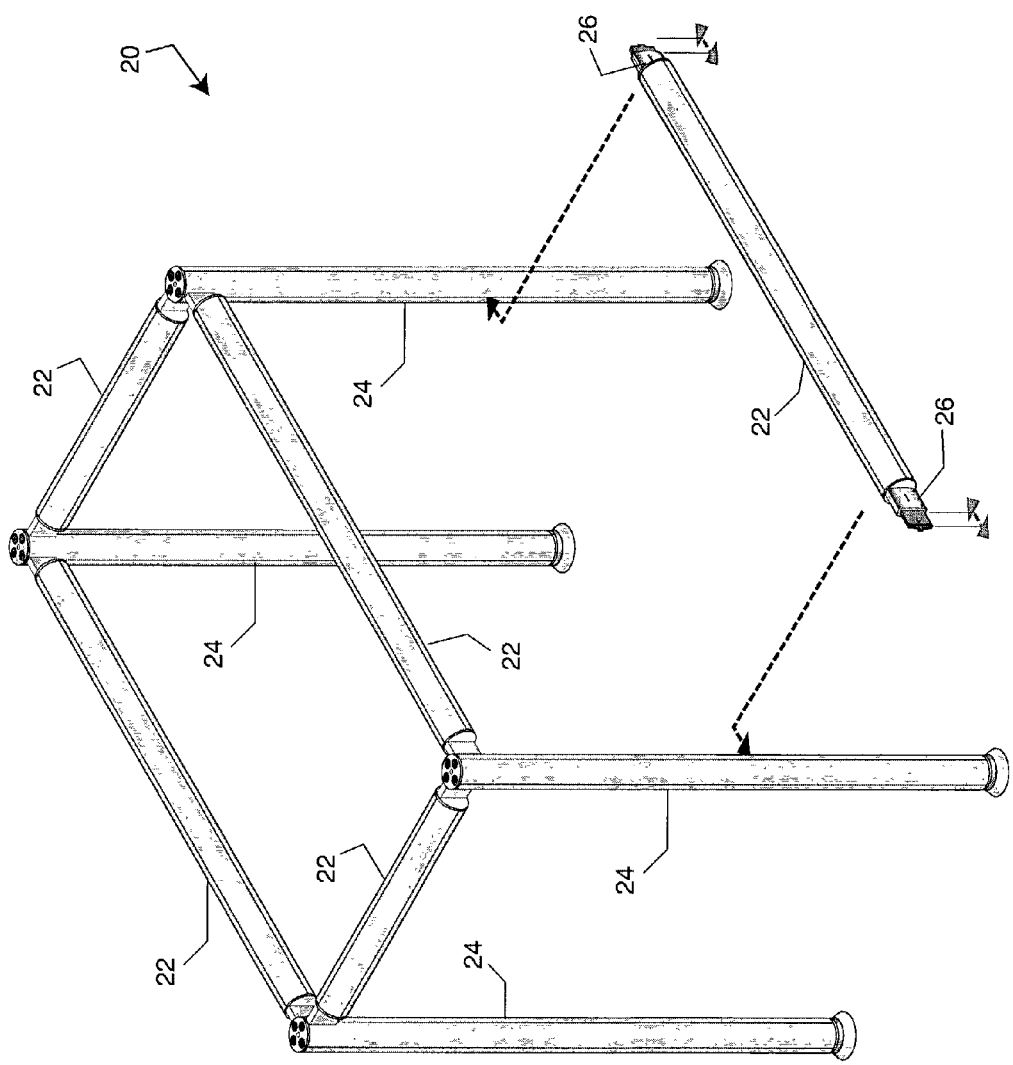
FIG. 1 is an isometric side view of one embodiment of a display system in accordance with the invention.

The basic components of one embodiment of a display system 20 in accordance with the invention are illustrated in FIG. 1. As used in this description, the terms "top," "bottom," "up," "down," "left," and "right" refer to the objects referenced in the drawings, which orientation is not necessary for achieving the objects of the invention.

In the embodiment depicted in FIG. 1, a plurality of beam assemblies 22 having connector assemblies 26 are coupled to a plurality of vertical post assemblies 24 via the connector assemblies 26. While the beam assemblies 22 are typically horizontal, in certain embodiments, the beam assemblies may include a mechanism, such as, for example, a hinge (not shown), that permits the beam assemblies 22 to be positioned diagonally to the vertical post assemblies 24 at any of various angles. In certain embodiments, multiple vertical post assemblies 24 are coupled to each other in vertical succession to permit increased heights. In certain embodiments, multiple beam assemblies 22 may be coupled to a single vertical post assembly 24 to provide for additional levels or support.

The horizontal beam assemblies 22 and vertical post assemblies 24 may be comprised of any material or combination of materials capable of satisfying a desired balance between weight and strength, including, for example, metals, plastics, fiberglass, or polymers. In certain advantageous embodiments, extremely lightweight materials are used, such as, for example, aluminum. These assemblies may be extruded, molded, or formed by any other known method.

Figure 2:
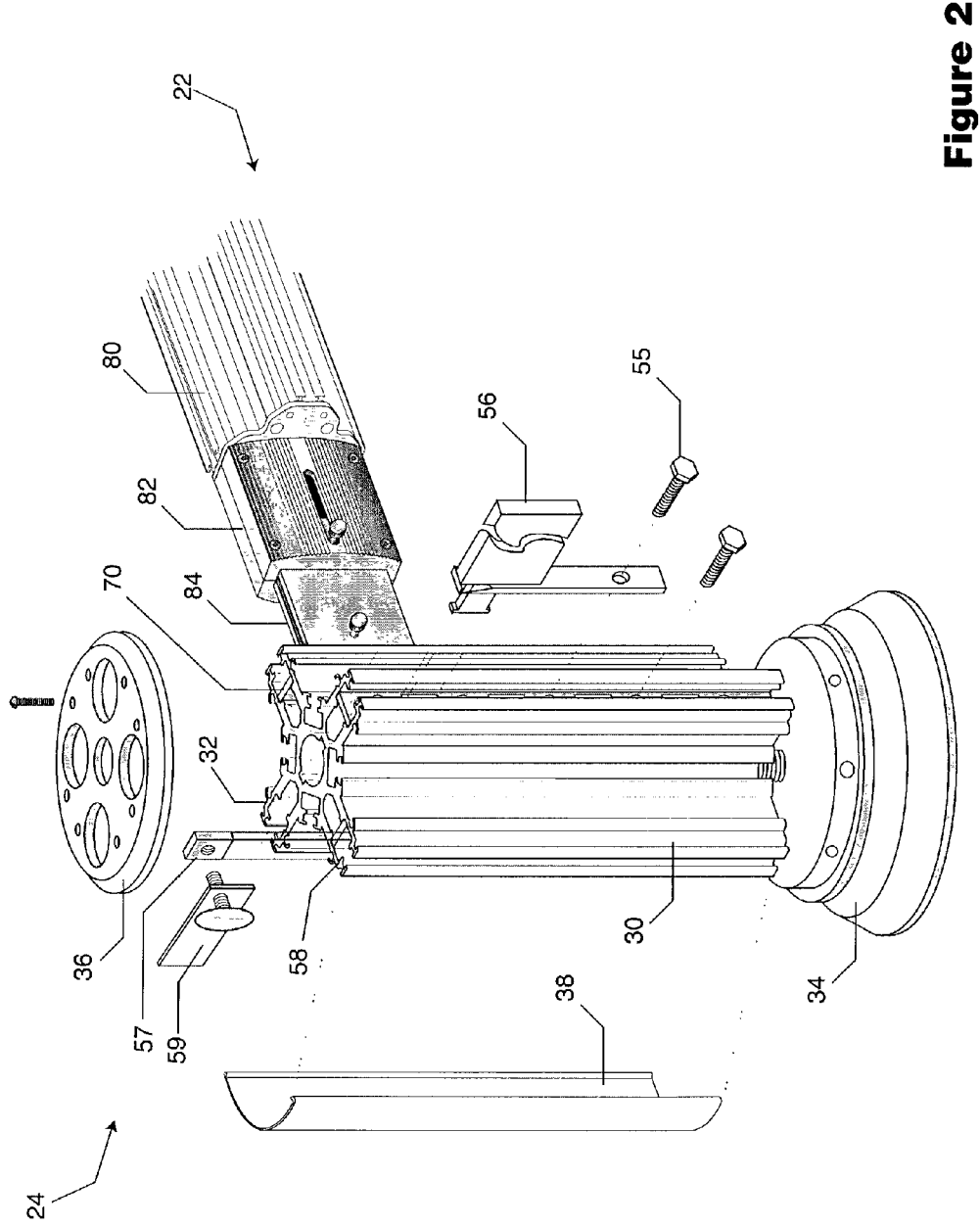
FIG. 2 is an isometric side view of one embodiment of a horizontal beam coupled to a vertical post assembly used in the display system of FIG. 1.
Figure 3C:
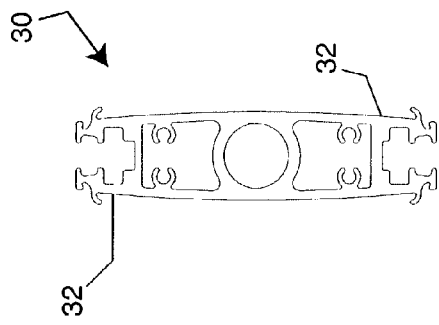
FIG. 3C is a top plan view of yet another embodiment of the radially projecting members of the vertical post assembly of FIG. 2.
Figure 3B:
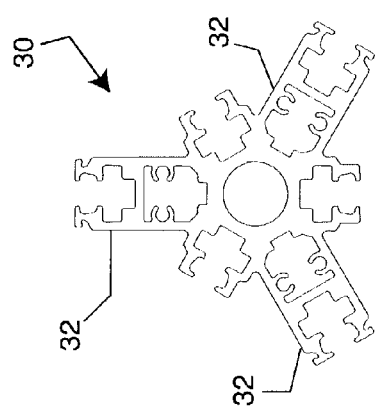
FIG. 3B is a top plan view of another embodiment of the radially projecting members of the vertical post assembly of FIG. 2.
Figure 3E:
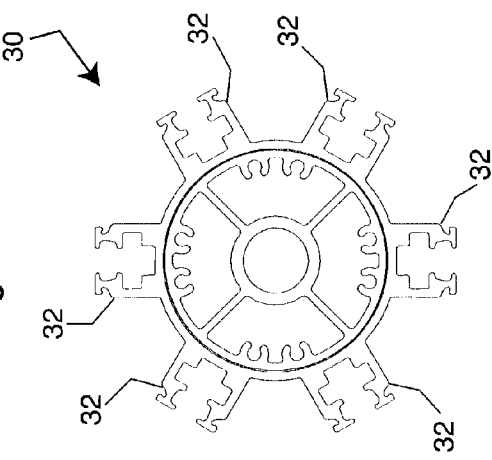
FIG. 3E is a top plan view of yet another embodiment of the radially projecting members of the vertical post assembly of FIG. 2.
Figure 3A:
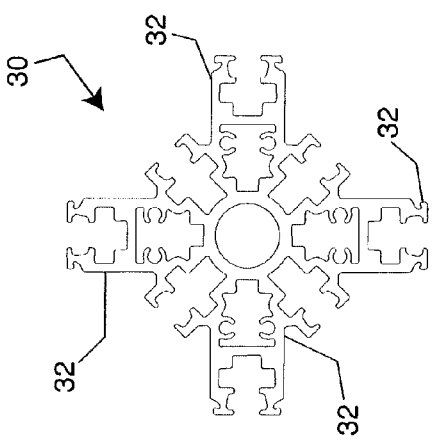
FIG. 3A is a top plan view of one embodiment of the radially projecting members of the vertical post assembly of FIG. 2.
Figure 3D:
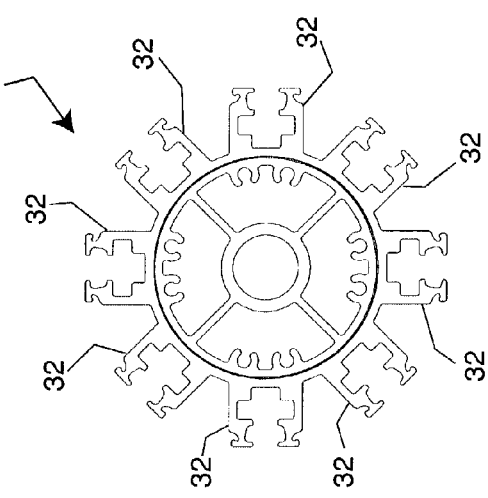
FIG. 3D is a top plan view of still another embodiment of the radially projecting members of the vertical post assembly of FIG. 2.

The basic components of one embodiment of the vertical post assembly 24 are illustrated in FIG. 2. A post 30 is formed to include a plurality of radially projecting members 32. The bottom of the post 30 is secured to a base 34, the top of the post 30 is covered with a top post cap 36, and the spaces between the radially projecting members 32 are covered with post covers 38.

As shown in FIGS. 3A through 3E, but not limited to the arrangements shown therein, the post 30 may be formed from any of various numbers of radially projecting members 32. In certain embodiments, where it is desired that beam assemblies 22 extend from the vertical post assemblies 24 in only one direction, the post 30 may have only one radially projecting member 32.

Figure 4A:
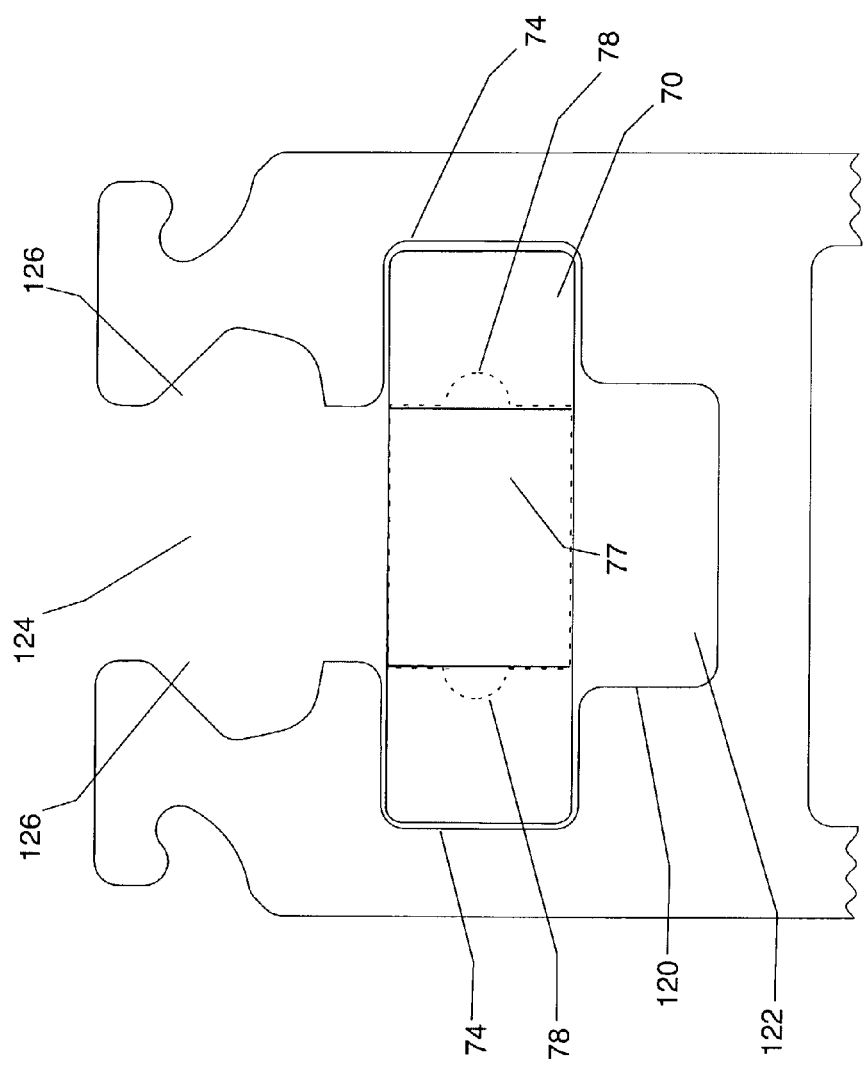
FIG. 4A is a top plan view of one embodiment of the radially projecting members of the vertical post assembly of FIG. 2 with one spline disposed therein.
Figure 4B:
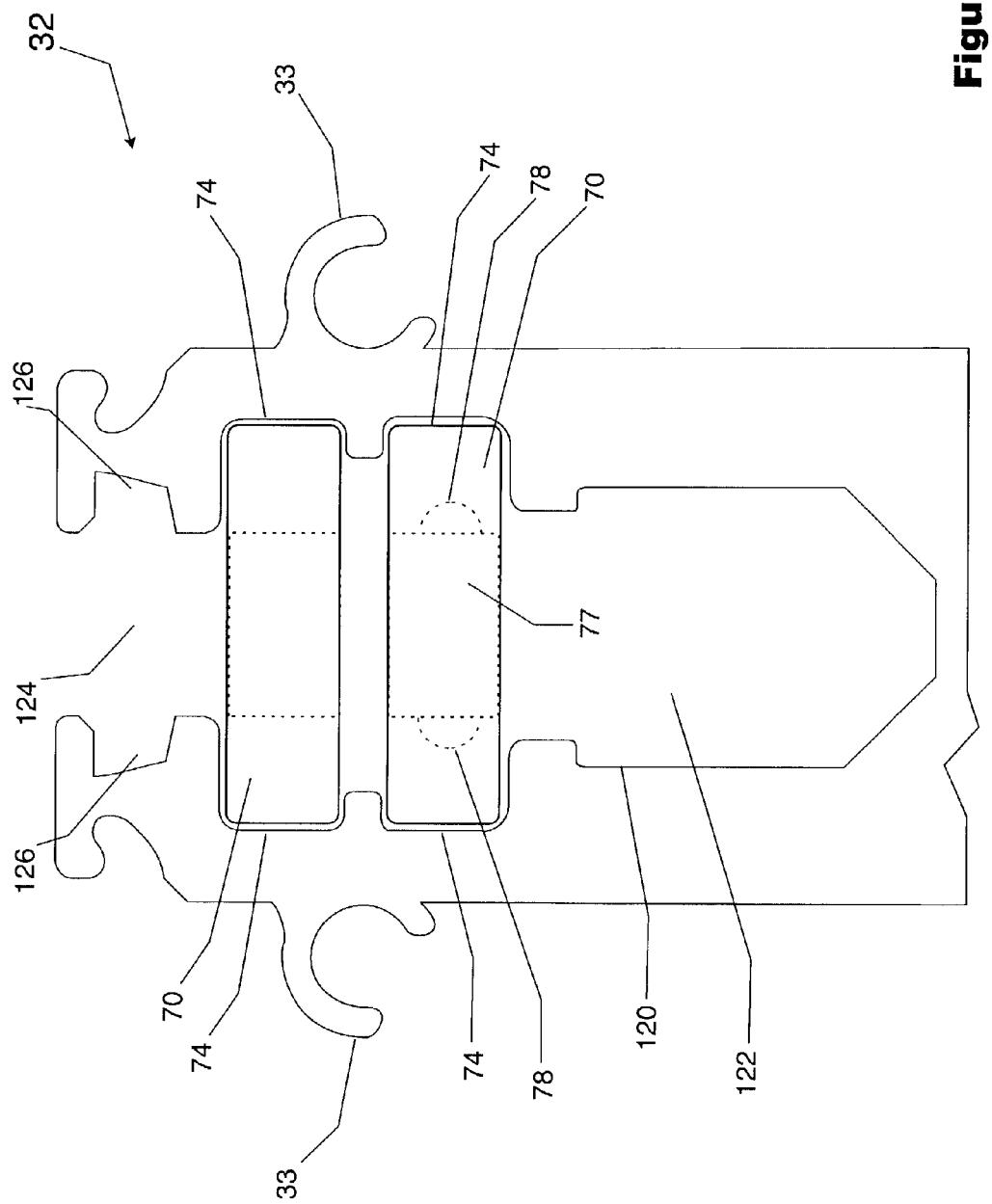
FIG. 4B is a top plan view of another embodiment of the radially projecting members of the vertical post assembly of FIG. 2 with two splines disposed therein
Figure 5:
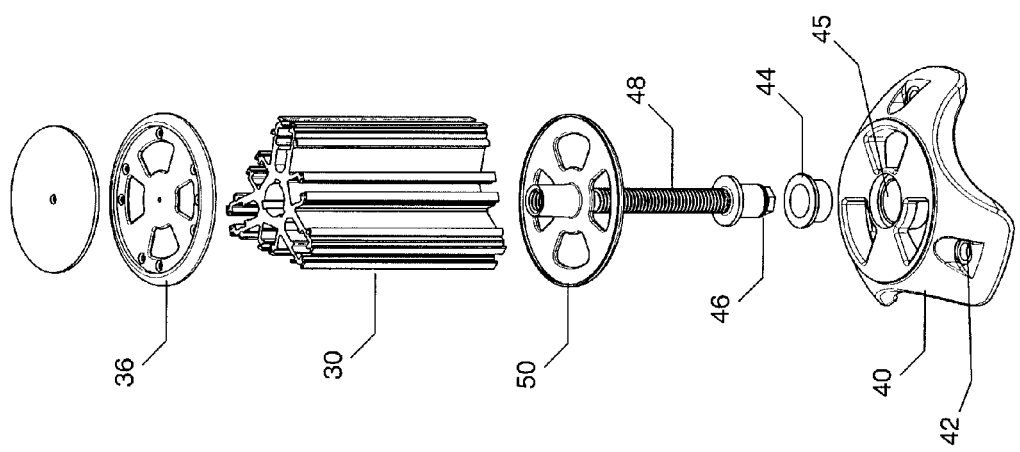
FIG. 5 is an exploded isometric view of one embodiment of the vertical post assembly of FIG. 2.

As shown in FIGS. 4A–B, the radially projecting member 32 has an inner wall 120 that defines a cavity 122 therein. In certain advantageous embodiments, the cavity 122 includes a plate-locking channel 124 defined by furrows 126 in the inner wall 120.

As shown in FIGS. 5 and 6A–D, the base 34 includes a base support member 40. In certain embodiments, the base support member 40 has a plurality of apertures 42 by which the base support member 40 is secured to a surface. A nut 46 is attached to a threaded rod 48, which nut is retained on the bottom of the base support member 40 by a cup 44 disposed in a well 45 of the base support member 40. The threaded rod 48 is screwed into an internally threaded bottom post cap 50, and thus, acts as a jackscrew for raising and lowering the post 30 when the nut 46 is rotated.

Figure 7:
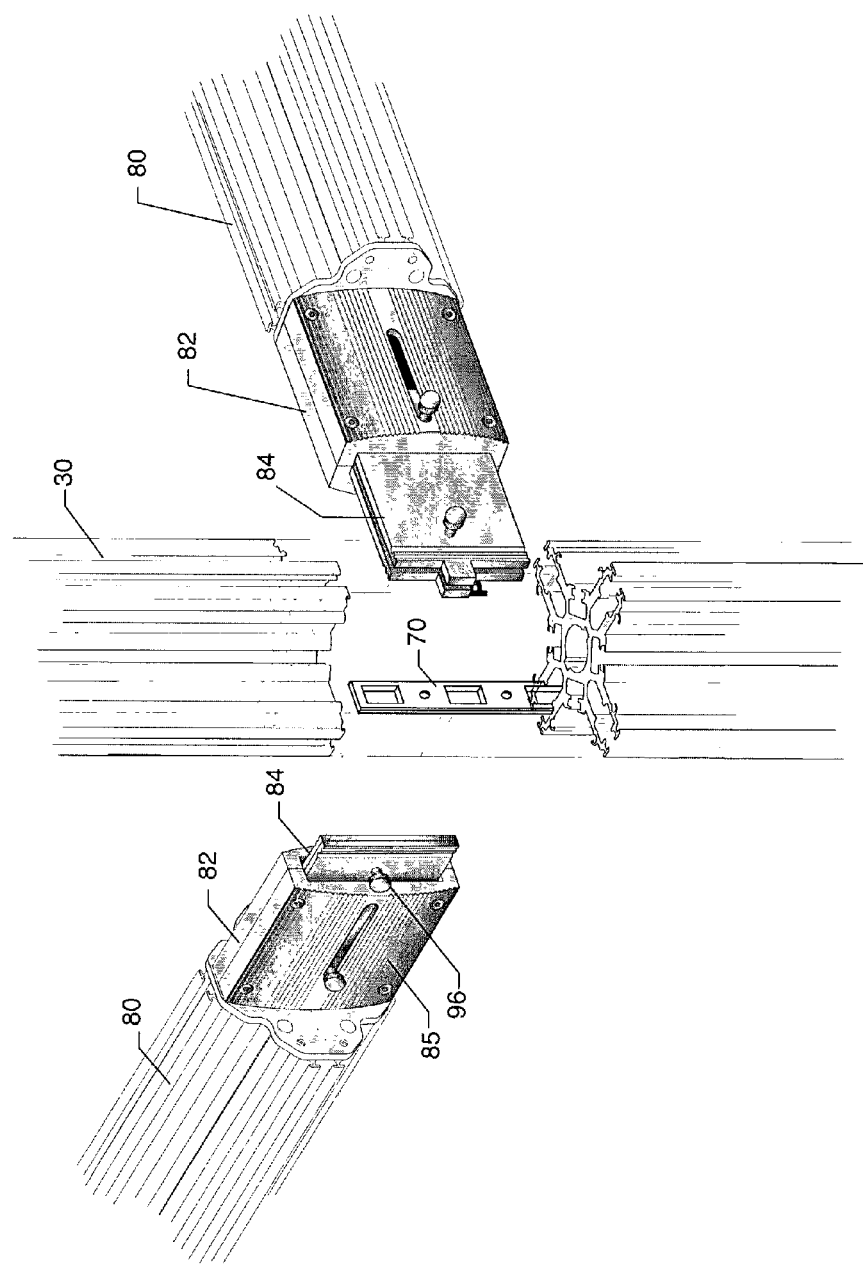
FIG. 7 is an isometric side view of one embodiment of one horizontal beam coupled to, and another horizontal beam not coupled to, the vertical post assembly of FIG. 2.
Figure 8:
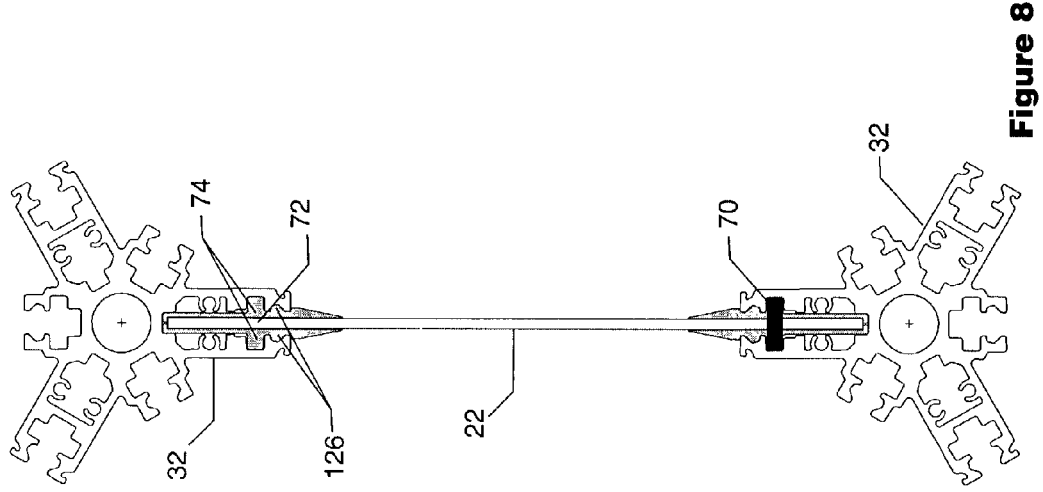
FIG. 8 is a top plan view of the spline of FIG. 7 disposed in one embodiment of the vertical post assembly of FIG. 7.

As shown in FIGS. 7 and 8, in certain advantageous embodiments, a spline 70 is disposed in a spline channel 72 of the radially projecting member 32. The spline channel is typically defined by two opposing grooves 74 in the inner wall of the radially projecting member 32. In certain embodiments, however, a single, larger groove 74 is employed.

Figure 9:
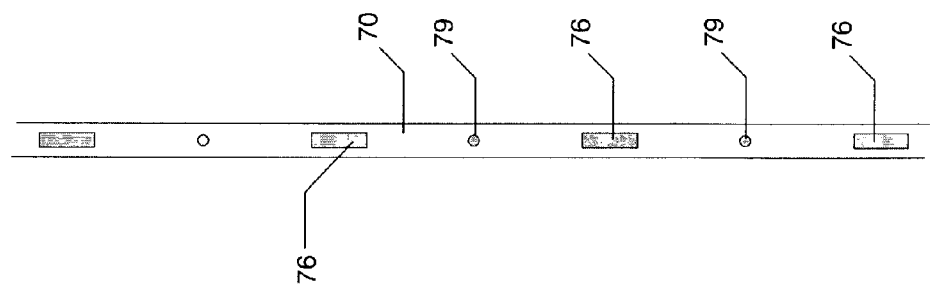
FIG. 9 is a side plan view of one embodiment of the spline of FIGS. 8.

As shown in FIG. 9, the spline 70 has least one connection slot 76 for receiving a tongue 100 of the connector assembly 26, further explained below. In certain advantageous embodiments, the spline 70 has a plurality of connection slots 76 to permit maximum versatility with respect to selecting the height at which to insert a beam assembly 22 into the display system 20. In certain embodiments, the connection slots 76, shown in phantom in FIGS. 4A–B, will themselves contain a tongue-locking channel 77 defined by grooves 78.

In certain advantageous embodiments, the spline 70 will include at least one threaded aperture 79, as illustrated in FIG. 2, for receiving screws or bolts 55 in order to attach peripheral objects 56, such as, for example, brackets, clamps, additional support members, lights, cable or fabric fastening, guiding, or supporting devices, or any other tool or accessory that one may desire to affix to the display system 20.

In certain embodiments, an aperture 79 will be located at a fixed distance from each connection slot 76 in the spline 70 in order to allow for maximum versatility with respect to attaching peripheral objects to different display systems 20 employing connection slots 76 at differing heights.

In certain other embodiments, instead of a spline 70, a fastener 57 is disposed in an radially projecting member 58, and peripheral objects 59 are attached to the fastener 57 (see FIG. 2).

Referring again to FIG. 2, the basic components of one embodiment of the beam assembly 22 are illustrated therein. A beam 80 is attached to a connector assembly 26. The connector assembly 26 includes connector housing 82 and plate assembly 84. The plate assembly 84 can be extracted from said housing and retracted back thereinto.

Figures 10A, 10B:
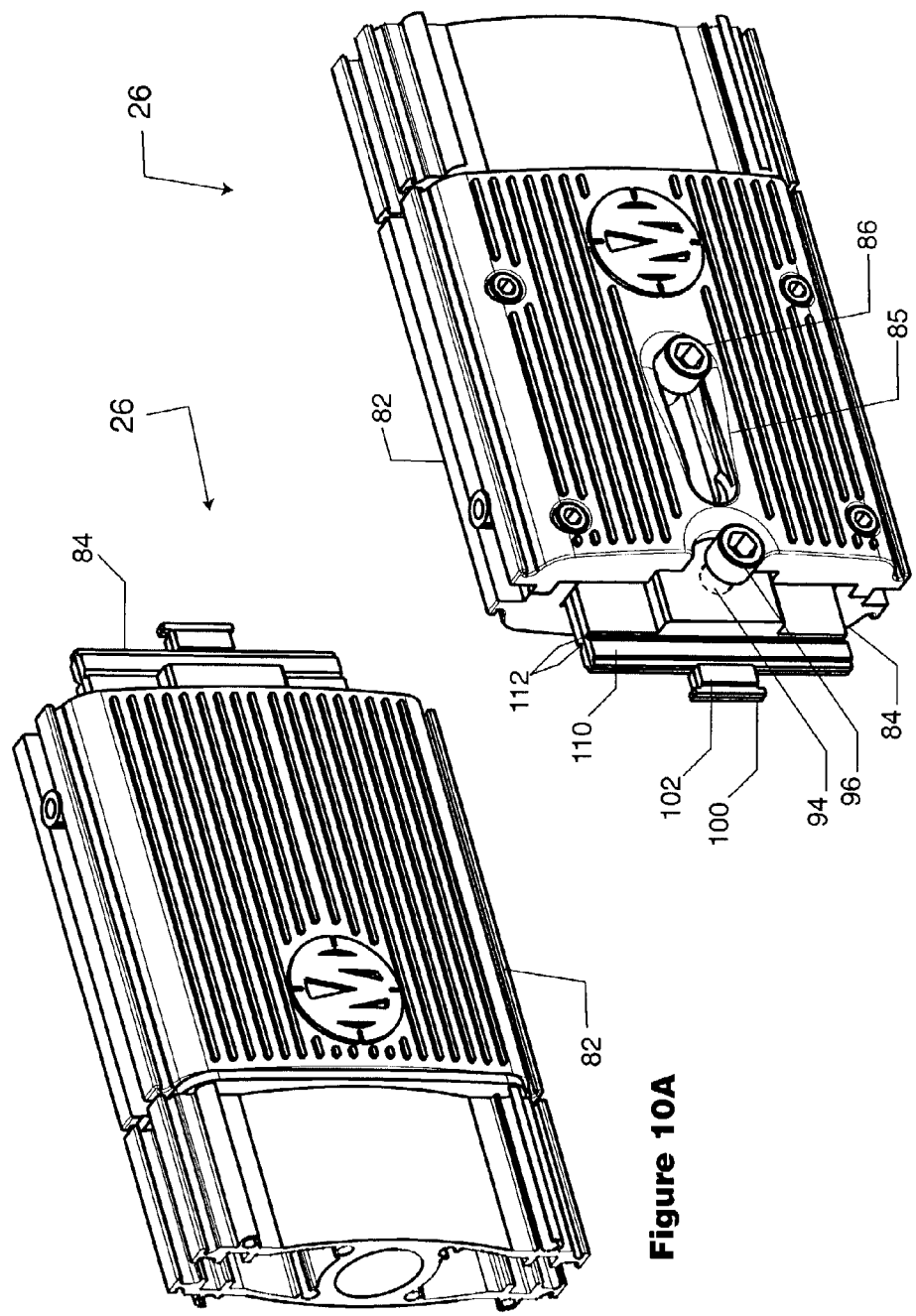
FIG. 10A is an isometric side view of one embodiment of a connector assembly used for connecting the horizontal beam of FIG. 2 to the spline of FIG. 8.
FIG. 10B is an isometric view of the other side of the connector assembly of FIG. 10A.
Figure 11:
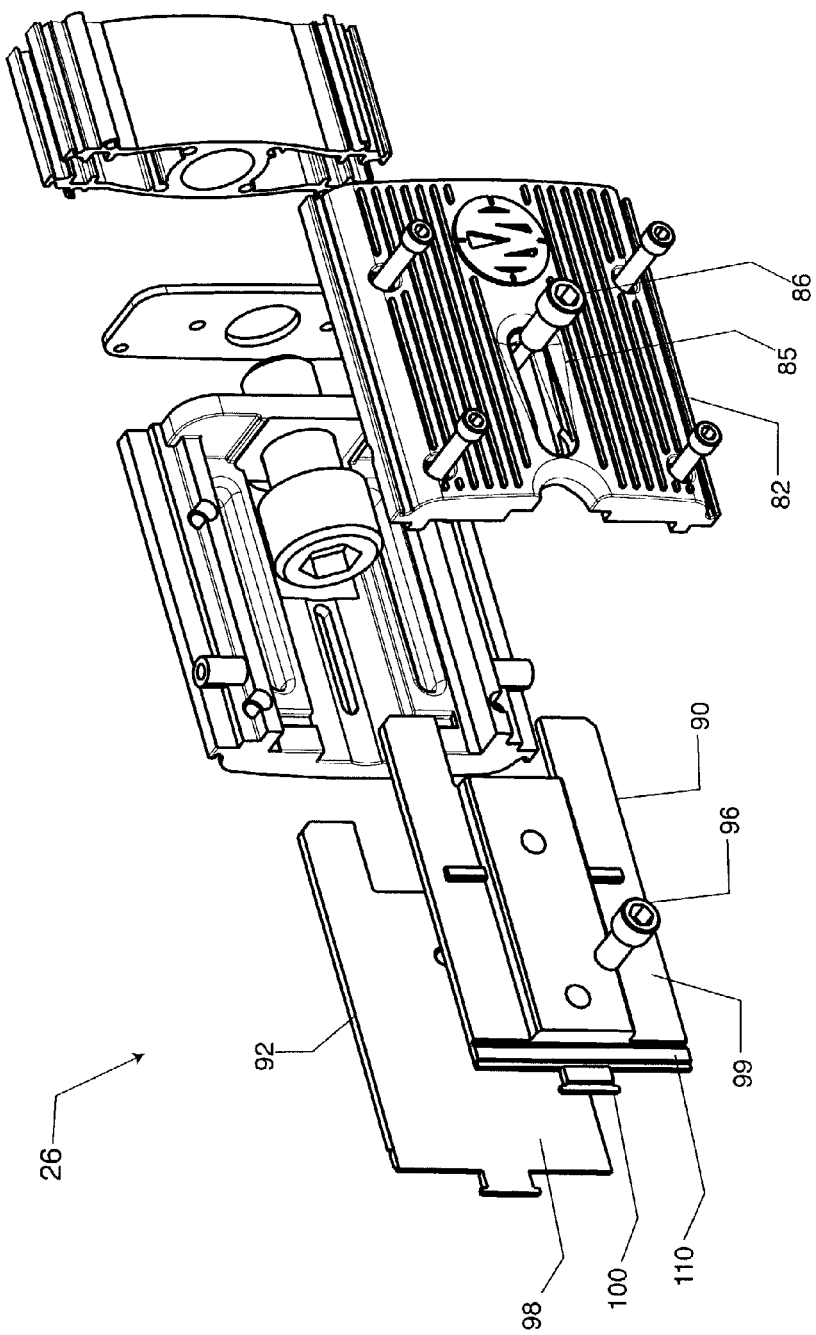
FIG. 11 is an exploded isometric side view of the connector assembly of FIGS. 10A–10B.

As shown in FIGS. 10A–B and 11, in certain advantageous embodiments, the housing 82 has an extraction slot 85. A pin 86 is coupled to the plate assembly 84 and extends out through the extraction slot 85 such that the plate assembly 84 may be extracted from, and retracted into, said connector housing 82 by moving the pin 86. In certain advantageous embodiments, the pin 86 is a screw that can be turned once the desired position of the plate assembly 84 is achieved in order to secure the plate assembly 84 in a desired position.

The plate assembly includes at least two adjacent plates 90 and 92 that can be separated from each other. In certain advantageous embodiments, the plate 90 has a threaded aperture 94 with a screw 96 screwed therein, such that one may turn the screw 96 in one direction to separate the plates 90 and 92 and in another direction to draw together the plates 90 and 92. For example, the base of the screw 96 may abut the inner face 98 of the plate 92, such that turning the screw clockwise will separate the plates 90 and 92.

In some embodiments, the plate assembly 84 may include a center plate, from which each of the plates 90 and 92 are separable.

In certain advantageous embodiments, at least one of the plates 90 and 92 includes a tongue 100.

Figure 12:
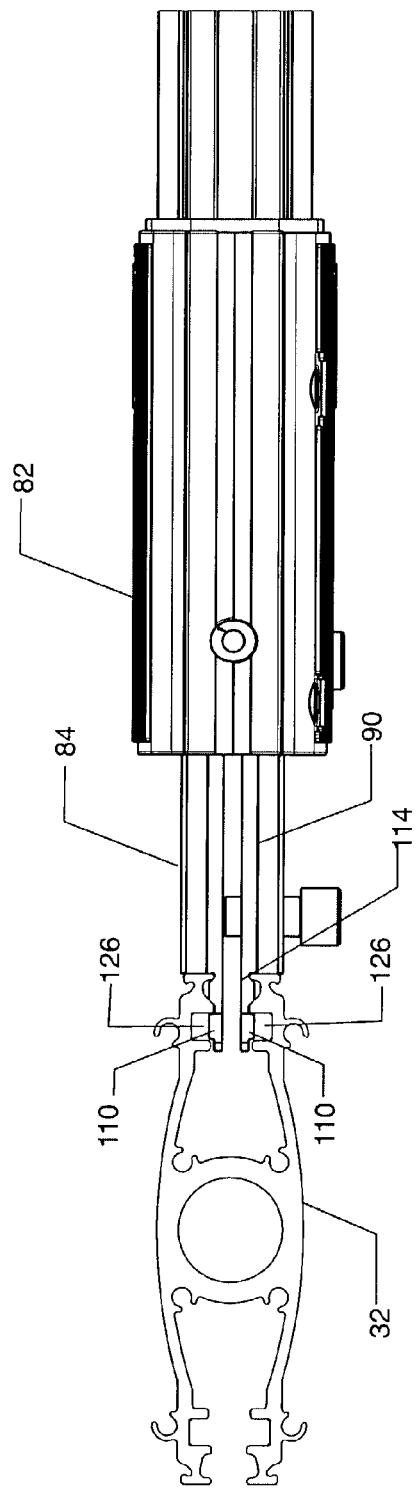
FIG. 12 is a top plan view of the connector assembly of FIGS. 10A–10B coupled to one embodiment of the vertical post assembly of FIG. 2.

In certain advantageous embodiments, at least one of the plates 90 and 92 has at least one plate-locking ridge 110. As illustrated in FIG. 12, the ridge 110 fits into the furrow 126 that defines the plate-locking channel 124. While the ridge 110 will typically be located on a non-tongue portion of the plate 90, 92 whether or not the plate 90, 92 has a tongue 100, in other embodiments, as illustrated in FIG. 12, the ridge 110 can be located on a tongue 100. The ridge 110 may be formed by at least one depression 112 in the outer face 99 of the plate 90, 92 next to the ridge 110. In other embodiments, the ridge 110 may be a raised portion of the outer face 99 of the plate 90, 92.

In certain advantageous embodiments, the tongue 100 includes at least one tongue-locking ridge 102 for locking the tongue 100 into the spline 70, irrespective of whether the plate 90, 92 also has a ridge 110 for locking the plate assembly 84 in the plate-locking channel 124. In some embodiments, the ridge 102 fits into a groove 78, shown in phantom in FIGS. 4A–B, of the connection slot 76 of the spline 70. In other embodiments, the ridge 102 becomes wedged against the rear face of the spline 70 when the plates 90, 92 are separated.

Figure 13:
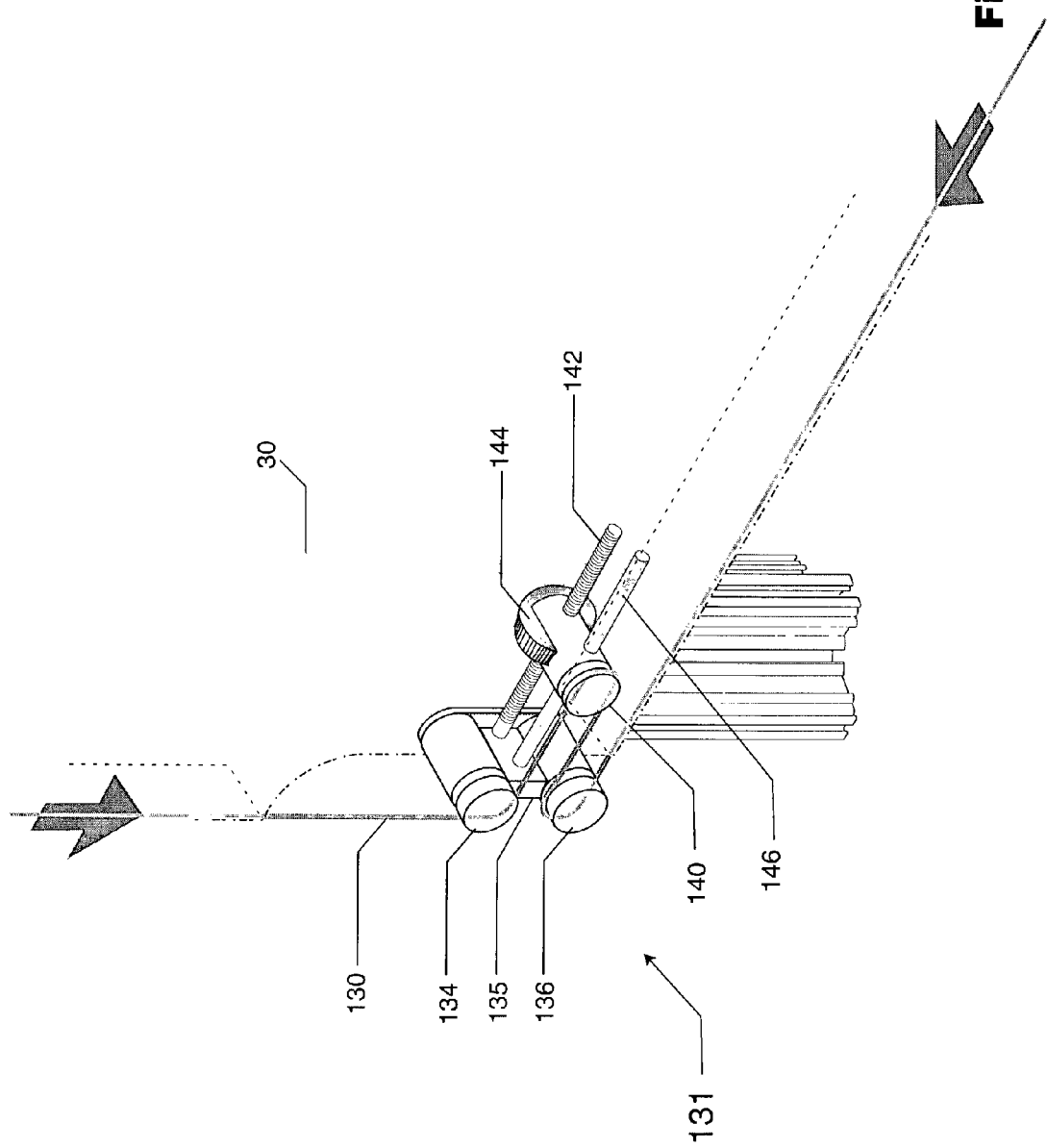
FIG. 13 is an isometric side view of one embodiment of a corner tensioning device used in the display system of FIG. 1.

As illustrated in FIG. 13, in some embodiments, when a two-dimensional frame is assembled, a panel of soft goods, such as, for example, fabric, scrim, paper, or tyvek, is stretched over the frame in order to create a wall or screen, which may, for example, serve as a divider or a screen for graphic displays. These panels of soft goods typically have a cable 130 hemmed along their outer edge.

In some of these embodiments, a corner tensioning device 131 is coupled to each vertical post assembly 30. The cable tensioning device 131 has guide wheels 134 and 136 connected by a center member 135. A threaded rod 142 with a worm wheel 144 disposed thereon extends laterally from the center member 135. Similarly, a guide rail 146 extends laterally from center member 135. A biasing wheel 140 is disposed on the guide rail 146 and is coupled to the worm wheel 144, such that the worm wheel 144 can be rotated in order to move the biasing wheel 140 along the guide rail 146 and away from the center member 135 and guide wheels 134 and 136.

The cable 130 is disposed on these corner tensioning devices 131, which cable wraps around the bottom of the guide wheel 134, up over the top of biasing wheel 140, and then back down around the bottom of the guide wheel 136. Thus, when the worm wheel 144 is rotated and the biasing wheel 140 is moved further away from the guide wheels 134 and 136, the tension in the cable is increased.

Figure 14:
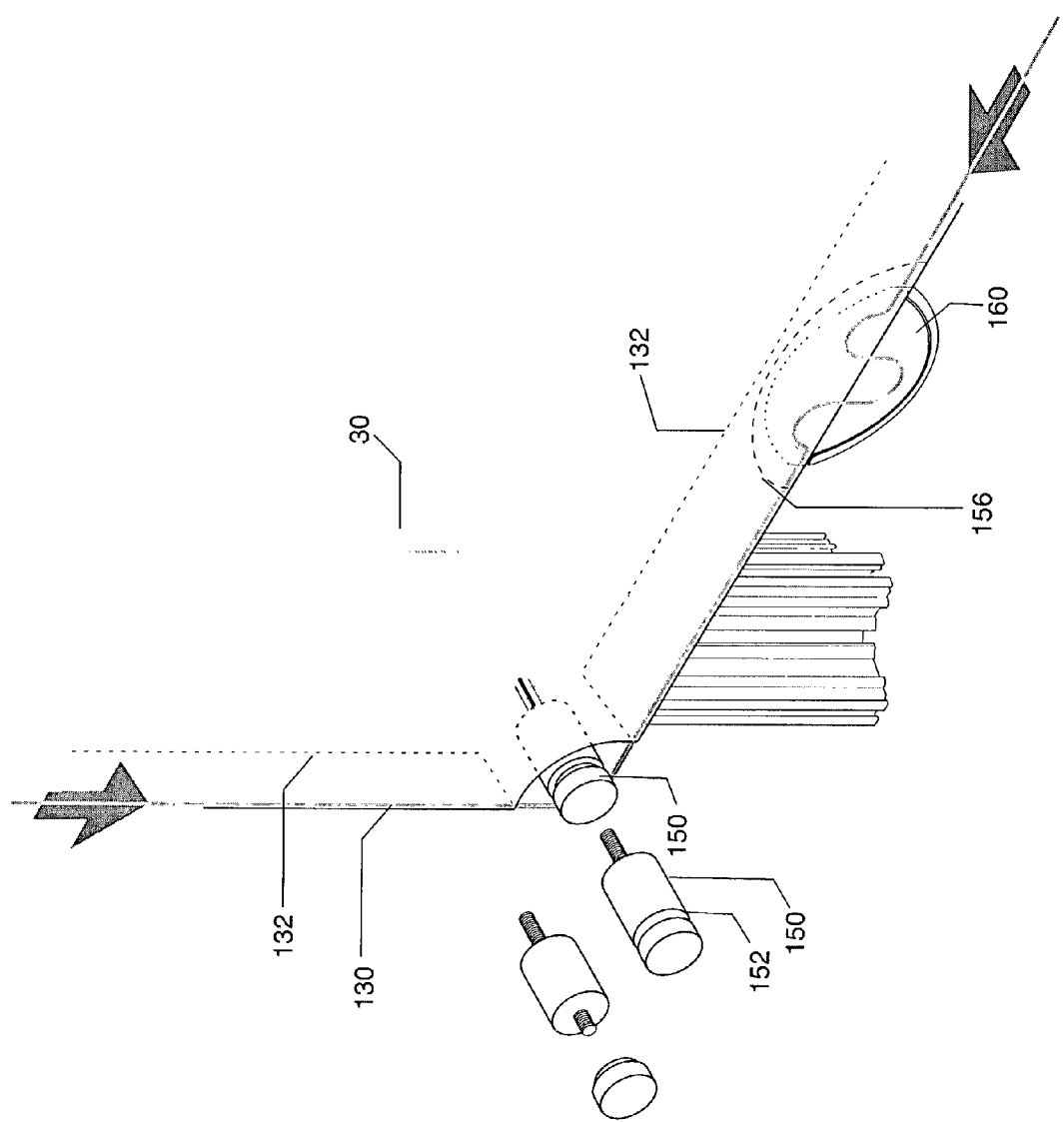
FIG. 14 is an isometric side view of one embodiment of an in-line tensioning device used in the display system of FIG. 1.

As illustrated in FIG. 14, in certain other embodiments, the cable 130 is disposed on a simple cable guide member 150 having a valley 152 in which said cable is disposed. In some of these embodiments, an inline tensioning device 160 is employed by clamping the tensioning device 160 on the cable 130 in a cut-out section 156 of the hem 132.

Figure 15:
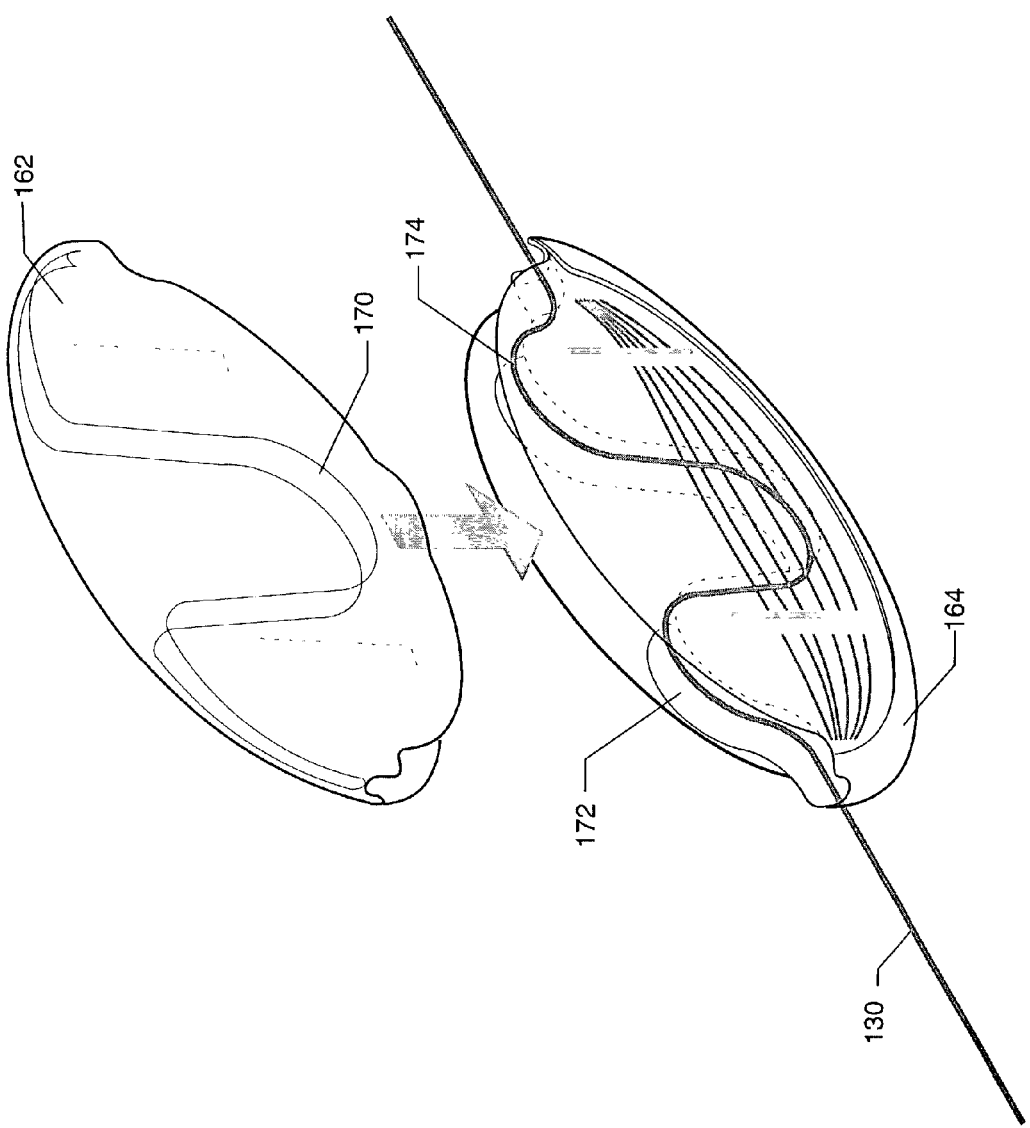
FIG. 15 is an isometric side view of the in-line tensioning device of FIG. 14.

As illustrated in FIGS. 15–16, the in-line tensioning device 160 includes a top portion 162 and a bottom portion 164 that are clamped together over the cable 130. The top portion 162 has an internally protruding center portion 170 and the bottom portion 164 has an internally protruding left portion 172 and an internally protruding right portion 174. Thus, when the top portion 162 and bottom portion 164 are squeezed together, the cable 130 is forced up over the left portion 172, down around the bottom of the center portion 170, and back up over the right portion 174, thereby tensioning the cable 130.

As illustrated in FIG. 17, in some embodiments, the bottom portion 164 includes a plurality of teeth 166, and the top portion 162 includes a plurality of notches 167 into which said teeth 166 fit, for securing the top portion 162 to the bottom portion 164. The tension in the cable 130 may be further increased by further squeezing the top portion 162 and bottom portion 164 together over successive teeth 166.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A display structure, comprising:
   at least one vertical post assembly having a cavity therein, said cavity having two opposing walls; and
   at least one beam assembly including:
      a beam;
      a connector housing; and
      a plate assembly disposed in, and extractable from, said connector housing such that said plate assembly forms an extension of said housing when extracted therefrom, which extension is insertable into said cavity, said plate assembly comprising a plurality of parallel connector plates; and
   wherein at least one of said plates is displaceable away from at least one other of said plates when said plate assembly is extracted from said housing and inserted into said cavity such that said plates remain parallel and abut said opposing walls of said cavity, whereby said plate assembly is secured to said vertical post assembly.

2. The display system of claim 1, further comprising a spline having at least one connection slot therein, wherein:
said cavity includes at least one spline channel;
said spline is disposed in said spline channel;
at least one of said plates includes a tongue extending longitudinally therefrom; and
said tongue is insertable into said at least one connection slot.

3. The display system of claim 2, wherein said tongue has at least one ridge on at least one face thereof, which at least one ridge abuts a face of said spline when said plate assembly is inserted in said cavity and said at least one plate is displaced away from said at least one other plate, thereby preventing retraction of said plate assembly.

4. The display system of claim 2, wherein:
said spline includes a tongue-locking channel defined by at least one groove in said spline, which groove faces said connection slot; and
said tongue has at least one ridge on at least one face thereof, which at least one ridge is disposed in said at least one groove in said spline when said plate assembly is inserted in said cavity and said at least one plate is displaced away from said at least one other plate.

5. The display system of claim 2, wherein said spline further has at least one threaded aperture therein for attaching peripheral objects.

6. The display system of claim 1, wherein:
said cavity includes a plate-locking channel defined by at least one furrow in at least one of said opposing walls; and
at least one of said plates has at least one ridge on at least one face thereof, which at least one ridge is disposed in said at least one furrow when said plate assembly is inserted in said cavity and said at least one plate is displaced away from said at least one other plate.

7. The display system of claim 6, further comprising a spline having at least one connection slot therein, wherein:
said cavity further includes at least one spline channel;
said spline is disposed in said spline channel;
at least one of said plates includes a tongue extending longitudinally therefrom; and
said tongue is insertable into said at least one connection slot.

8. The display system of claim 7, wherein said tongue has at least one ridge on at least one face thereof, which at least one ridge abuts a face of said spline when said plate assembly is inserted in said cavity and said at least one plate is displaced away from said at least one other plate, thereby preventing retraction of said plate assembly.

9. The display system of claim 7, wherein:
said spline includes a tongue-locking channel defined by at least one groove in said spline, which groove faces said connection slot; and
said tongue has at least one ridge on at least one face thereof, which at least one ridge is disposed in said at least one groove in said spline when said plate assembly is inserted in said cavity and said at least one plate is displaced away from said at least one other plate.

10. The display system of claim 7, wherein said spline further has at least one threaded aperture therein for attaching peripheral objects.

11. The display structure of claim 1, wherein:
said plate assembly further comprises at least one separation screw;
at least one of said plates has a threaded aperture therein; and
said separation screw is threaded through said aperture, such that said screw may be rotated to displace said plate having said aperture further away from said at least one other plate.

12. The display structure of claim 1, wherein:
said housing has an extraction slot therein; and
said beam assembly further comprises a pin coupled to at least one of said plates and extending laterally therefrom and through said extraction slot, by which pin said plate assembly may be extracted from, and retracted into, said housing.

13. The display structure of claim 12, wherein said pin is a screw that can be tightened such that said plate assembly can be secured in either an extracted or retracted position.

14. The display structure of claim 1, wherein said vertical post assembly further comprises an adjustable base.

15. The display structure of claim 14, wherein said adjustable base comprises:
an internally threaded bottom post cap;
a base support member having a top side and a bottom side; and
a jackscrew secured to said base support member by a nut at said bottom side thereof and extending vertically from said top side thereof and screwed into said cap.

16. A display structure, comprising:
at least two vertical post assemblies and at least two horizontal beam assemblies coupled thereto defining a plane having a perimeter and four corners;
wherein at least one of said vertical post assemblies has a cavity therein, said cavity having two opposing walls; and
wherein at least one of said horizontal beam assemblies includes:
a beam;
a connector housing; and
a plate assembly disposed in, and extractable from, said connector housing such that said plate assembly forms an extension of said housing when extracted therefrom, which extension is insertable into said cavity, said plate assembly comprising a plurality of connector plates;
wherein at least one of said plates is displaceable away from at least one other of said plates when said plate assembly is extracted from said housing and inserted into said cavity such that said plates abut said opposing walls of said cavity, whereby said plate assembly is secured to said vertical post assembly;
at least one corner tensioning device coupled to at least one of said vertical post assemblies at least one of said corners, including:
two guide wheels connected by a center member;
a threaded rod connected to said center member and extending laterally therefrom;
a worm wheel disposed on said threaded rod;
a guide rail connected to said center member and extending laterally therefrom; and
a biasing wheel disposed on said guide rail and coupled to said worm wheel; and
a cable extending around said perimeter and disposed on said tensioning device such that said cable loops down around the bottom of one of said guide wheels, up around the top of said biasing wheel, and then down around the bottom of said other guide wheel;

wherein turning the worm wheel in one direction moves said biasing wheel along said guide rail away from said guide wheels, thereby tensioning said cable.

17. A display structure, comprising:

at least two vertical post assemblies and at least two horizontal beam assemblies coupled thereto defining a plane having a perimeter and four corners;

a cable guide member coupled to said vertical post assembly at each said corner;

a cable extending around said perimeter and disposed on said cable guide members; and an in-line tensioning device, including:

a top portion having an internally protruding center portion; and a bottom portion having an internally protruding right portion and an internally protruding left portion;

wherein, when said bottom portion is displaced under said cable, said top portion can be clamped over said cable and to said bottom portion, thereby forcing said cable up over said protruding right portion, down under said protruding center portion, and up over said protruding left portion, thereby increasing the tension in said cable.

18. The display structure of claim 17, wherein:

said top portion has a plurality of teeth; and said bottom portion has a plurality of notches into which said teeth fit, such that the tension in said cable may be further increased by further squeezing said top portion and said bottom portion together over successive numbers of said teeth.

19. A method of assembling display systems, comprising:

providing a vertical post assembly including a cavity with a channel therein;

providing a beam assembly including a connector housing and a plate assembly having two parallel plates with ridges on the outer faces thereof disposed in the housing;

moving the plate assembly into the cavity; and exerting a force to separate the plates when the ridges are coplanar with the channel so that the plates remain parallel and the ridges enter the channel, thereby retaining the plate assembly in the cavity.

20. A display structure, comprising:

at least one vertical post assembly having a cavity therein, said cavity having two opposing walls and at least one spline channel; and at least one beam assembly including:

a beam;

a connector housing; and a plate assembly disposed in, and extractable from, said connector housing such that said plate assembly forms an extension of said housing when extracted therefrom, which extension is insertable into said cavity, said plate assembly comprising a plurality of connector plates, at least one of said plates having a tongue extending longitudinally therefrom; and a spline disposed in said spline channel, said spline comprising a support member having at least one connection slot into which said tongue is inserted when said extension is inserted into said cavity;

wherein at least one of said plates is displaceable away from at least one other of said plates when said plate assembly is extracted from said housing and inserted into said cavity such that said plates abut said opposing walls of said cavity, whereby said plate assembly is secured to said vertical post assembly.

* * * * *